United States Patent Office 2,993,870
Patented July 25, 1961

2,993,870
PROCESS OF TRIMERIZING ORGANIC ISOCYANATES
John Burkus, Pompton Plains, N.J., assignor to United States Rubber Company, New York, N.Y., a corporation of New Jersey
No Drawing. Filed Aug. 20, 1957, Ser. No. 679,127
12 Claims. (Cl. 260—2.5)

This invention relates to an improved process of trimerizing organic isocyanates, particularly aromatic isocyanates. While my method is applicable to the trimerization of aliphatic isocyanates, the aliphatic isocyanates are in general readily trimerized by prior art methods, and the advantages of using the method of my invention are usually small in such cases.

Prior art methods for making aromatic isocyanate trimers have all been characterized by relatively high temperatures, long reaction times, and low yields. It has now been found that if the trimerization is carried out with the aid of a catalytic agent which can be either (1) a N,N',N''-tris-dialkylaminoalkyl-sym-hexahydrotriazine, or
(2) a N,N',N''-trialkyl-sym-hexahydrotriazine in the further presence of a tertiary aliphatic amine; trimerization may be initiated at room temperatures, e.g., 20–25° C., or lower, and proceeds rapidly to substantially complete reaction without the need of applying external heat.

The hexahydrotriazine catalyst chemicals used in my invention may be prepared by the method described by Graymore (Journal of the Chemical Society of London, 1931, page 1493) for the preparation of tripropyltrimethylenetriamine (i.e., N,N',N''-tripropyl-sym-hexahydrotriazine), in which anhydrous propylamine is reacted with cold 40% aqueous formaldehyde solution. The desired alkyl or dialkylaminoalkyl group, in which the alkyl groups are lower alkyl radicals, is obtained by substituting the appropriate amine for the propylamine used by Graymore; e.g., 3-dimethylaminopropylamine gives N,N',N'' - tris-(3-dimethylaminopropyl)-sym-hexahydrotriazine. An alternative method applicable to making certain of the hexahydrotriazine catalyst chemicals is described in U.S. Patent No. 1,471,213, dated October 16, 1923, to Morris G. Shepard and Harold S. Adams.

The reaction which occurs in this invention may be represented by the following equation:

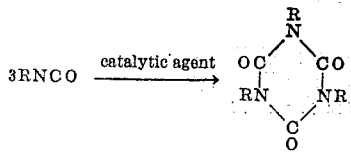

in which RNCO is an organic isocyanate, and in particular may be an aromatic isocyanate, i.e., one in which the —NCO group is attached to a nuclear carbon atom in an aromatic ring system; and the product, a trimer of the isocyanate, is an isocyanurate, formed by the trimerization of the isocyanate groups, and believed to have the structural formula given in the above equation.

The amount of the hexahydrotriazine catalyst chemical used may be relatively small, as little as 0.1 to 2 moles per 100 moles of isocyanate being sufficient; larger proportions, however, may be used without harmful effect. The same proportions apply to the tertiary amine where used.

The tertiary amine may be any compound containing a nitrogen atom bonded to three aliphatic carbon atoms, and containing no groups reactive with isocyanate under the conditions of the trimerization reaction. Examples of such amines are triethylamine, N-methylmorpholine, diethylcyclohexylamine, di(beta-diethyl aminoethyl) adipate. Mixtures of such amines may be used.

In the aromatic isocyanates to which my method is particularly applicable, the radical R to which the isocyanate group is attached may be any of the aromatic carbon ring systems, such as phenyl, naphthyl, anthryl. The radical R may also comprise other substituents in its ring system, the nature of such substituents being limited only in that they must be substantially unreactive with the isocyanate group and the catalytic agent, under the conditions of the trimerization reaction.

The method is applicable to the trimerization of the isocyanate groups in organic di- and polyisocyanates, in which case complete reaction leads to the formation of cross-linked, insoluble products. In particular, the radical R with its attached isocyanate group may form the end-groups of a liquid diisocyanate-modified intermediate, such as is formed by the action of an aromatic diisocyanate with a polyester or polyether glycol having terminal hydroxyl groups, the number of isocyanate groups being greater than the stoichiometric equivalent of the number of hydroxyl groups. In such a case, the intermediate becomes polymerized and cross-linked through trimerization of the isocyanate groups, and is insoluble in all solvents; my method thus constitutes a means for cross-linking such an intermediate, the molecules of which have isocyanate groups attached to both ends. Solid and foamed polymers may thus be made by my method, from the liquid diisocyanate-modified intermediates customarily used to make polyurethane polymers.

The reaction may be carried out either in the presence or in the absence of a solvent. Use of a solvent is sometimes advantageous, to moderate the speed of the reaction by dilution and by reflux distillation of the solvent, and to facilitate purification of the product. If a solvent is used, its choice is governed by the following considerations: (1) it should preferably dissolve all of the reactants; (2) it should not react with the reactants or the product to any significant extent; (3) it should not unduly retard the rate of reaction; and (4) it should preferably be easily separable from the reaction product. In connection with item (3), it has been observed that the solvent may exert a noticeable specific effect on the reaction rate, toluene giving a higher rate than ethyl ether, for example. In connection with item (4), it is advantageous to use a solvent which is relatively volatile, and which does not dissolve the product. Thus, while dimethylformamide could be used in place of toluene in Examples 2, 3 and 4 below, the latter is preferred, since the former is a solvent for the triphenyl isocyanurate formed, which is only slightly soluble in toluene.

The following examples illustrate my invention.

*Example 1.—Trimerization of phenyl isocyanate using N,N',N'' - tris - dialkylaminopropyl - sym-hexahydrotriazines as catalysts*

One ml. of N,N',N''-tris-(3-dimethylaminopropyl)-sym-hexahydrotriazine was placed in a 25 ml. Erlenmeyer flask, and 5 ml. of phenyl isocyanate were added. A very vigorous reaction ensued. The reaction mixture began to boil within a minute and it soon became a solidified mass to which were added 20 ml. of dry toluene. The product was collected on a Buchner funnel and then recrystallized from toluene. The recrystallized product upon drying melted at 268° C.–271° C. and gave the following analytical results:

| | Percent C | Percent H | Percent N |
|---|---|---|---|
| Found | 70.42 | 4.32 | 11.51 |
| Theoretical (for phenyl isocyanate trimer) | 70.58 | 4.23 | 11.76 |

Example 2

Into a 25 ml. Erlenmeyer flask were added 1 ml. of N,N',N''-tris-(3 - dimethylaminopropyl)-sym-hexahydrotriazine and 5 ml. of dry toluene. Upon the addition of 5 ml. of phenyl isocyanate a very vigorous reaction began and within a few minutes boiling and precipitation were evident. The product was collected on a Buchner funnel and then recrystallized from toluene. The observed melting point of the resulting material was 268° C.-270° C. and it gave the following analytical results:

|  | Percent C | Percent H | Percent N |
|---|---|---|---|
| Found | 70.65 | 4.37 | 11.61 |
| Theoretical (for phenyl isocyanate trimer) | 70.58 | 4.23 | 11.76 |

Example 3

A highly exothermic reaction was observed to occur upon the addition of 5 ml. of phenyl isocyanate to a solution of 5 ml. of toluene and 1 ml. of N,N',N''-tris-(3-diethylaminopropyl)-sym-hexahydrotriazine. Within a few minutes of reaction time a precipitate began to form. The precipitate was collected on a Buchner and then recrystallized from toluene. The product melted at 268° C.-270° C. and it gave the following analytical results:

|  | Percent C | Percent H | Percent N |
|---|---|---|---|
| Found | 70.71 | 4.43 | 11.52 |
| Theoretical (for phenyl isocyanate trimer) | 70.58 | 4.23 | 11.76 |

Example 4

Into a 25 ml. Erlenmeyer flask were added 5 ml. of dry toluene and one gram of N,N',N''-tris-(3-morpholinylpropyl)-sym-hexahydrotriazine. The triazine was not soluble to any large extent in toluene; however, a very vigorous reaction set in upon the addition of 5 ml. of phenyl isocyanate. External cooling was necessary to prevent excessive boiling of the reaction mixture. A white precipitate soon formed which was collected on a Buchner. The sticky nature of the precipitate indicated contamination with the triazine catalyst. The contaminant was removed by dissolving the precipitate in dimethylformamide, and adding this solution to water with stirring. The resulting precipitate was collected on a Buchner, air-dried, and recrystallized from toluene. The material melted at 268° C.-270° C.

Example 5. — The synthesis of tris-[2-methyl-5-(2-hydroxybutylureido)phenyl]-isocyanurate, a trihydroxy triphenyl isocyanurate represented by the formula:

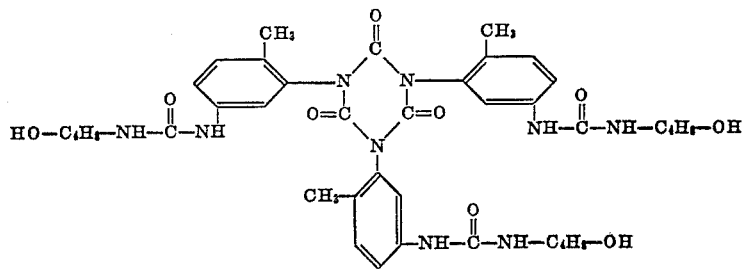

The synthesis of the above compound was accomplished by first reacting equimolar quantities of 2,4-toluene diisocyanate (12.2 gms.) and butanolamine (6.2 gms.) in dimethylformamide (25 ml.) and then adding 2 ml. of N,N',N''-tris-[3-diethylaminopropyl]-sym-hexahydrotriazine. After about two hours of reaction time the triazine present, the reaction mixture was poured into about 100 ml. of water with stirring. The collected precipitate was redissolved in dimethylformamide and precipitation was again accomplished by addition of the solution to 100 ml. of water. The precipitate was collected on a Buchner and air-dried.

Example 6.—Preparation of tris-(2-methyl-5-isocyanatophenyl) isocyanurate

The product of Example 5 was heated at reduced pressure (10 mm. of mercury and 150-200° C.) whereupon the ureido groups decomposed, butanol was distilled off, and a tri-isocyanate was left having the structure:

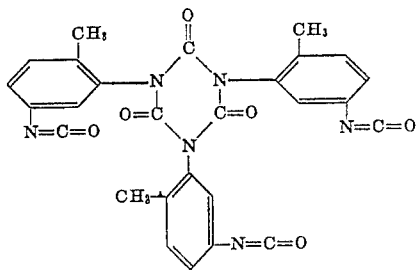

Example 7.—An attempt to trimerize phenyl isocyanate with N,N',N''-tris-n-butyl-sym-hexahydrotriazine Five ml. of phenyl isocyanate were added to a solution of 1 ml. of N,N',N''-tris-n-butyl-sym-hexahydrotriazine and 5 ml. of dry toluene contained in a 25 ml. Erlenmeyer flask. A small exotherm was observed on the addition of the phenyl isocyanate; however, no precipitate was observed within 24 hours, and after 110 days no precipitate was formed.

Example 8.—Trimerization of phenyl isocyanate with the combination of N,N',N''-tris-n-butyl-sym-hexahydrotriazine and triethylamine Into a 25 ml. Erlenmeyer flask were added 1 ml. of N,N',N''-tris-n-butyl-sym-hexahydrotriazine, ½ ml. of triethylamine, 5 ml. of toluene and 5 ml. of phenyl isocyanate. Only a slight exotherm was observed; however, a precipitate did begin to form after two hours of reaction and it appeared complete after six hours. After recrystallization from toluene the product melted at 268° C.-270° C. and gave the following analysis:

|  | Percent N |
|---|---|
| Found | 11.48 |
| Theoretical (for phenyl isocyanate trimer) | 11.76 |

Example 9.—An attempt to trimerize phenyl isocyanate with N,N',N''-tris-n-propyl-sym-hexahydrotriazine The following reagents were charged with a 25 ml. Erlenmeyer flask; 1 ml. of N,N',N''-tris-n-propyl-sym-hexahydrotriazine, 5 ml. of dry toluene and 5 ml. of phenyl isocyanate. There was no discernible precipitate after several days of reaction.

Example 10.—Trimerization of phenyl isocyanate with the combination of N,N',N''-tris-n-propyl-sym-hexahydrotriazine and N-methyl morpholine Five ml. of phenyl isocyanate were added to a solution of 1 ml. of N,N',N''-tris-n-propyl-sym-hexahydrotriazine, ½ ml. of N-methyl morpholine and 5 ml. of dry toluene contained in a 25 ml. Erlenmeyer flask. After about three hours a precipitate became discernible and a yield of 4.5 gms. was obtained which melted at 268° C.–270° C. and for which the following analysis was obtained:

|  | Percent C | Percent H | Percent N |
|---|---|---|---|
| Found | 70.68 | 4.55 | 11.68 |
| Theory (for triphenyl isocyanurate) | 70.58 | 4.23 | 11.76 |

*Example 11.—Gelation of a diisocyanate-modified polyester with N,N',N''-tris-(3-dimethylamino propyl)-sym-hexahydrotriazine*

The polyester was an 80–20 polyethylene-polypropylene adipate with a molecular weight of about 2000, having predominantly hydroxyl end-groups. One mole of the polyester was reacted with 2.2 moles of 2,4-tolylene diisocyanate at 90° C. for 3 hours.

100 grams of the diisocyanate modified polyester were mixed with 1 gram of N,N',N''-tris-(3-dimethylamino-propyl(-sym-hexahydrotriazine at room temperature. A gelled product, insoluble in dimethylformamide, was formed in about 3 hours.

*Example 12.—Preparation of foams insoluble in dimethylformamide from linear polyesters*

A polyester, prepared by the esterification of adipic acid with propylene glycol, having predominantly hydroxyl end-groups and possessing a molecular weight of about 1800, was reacted with a mixture which contained 65% of 2,4-tolylene diisocyanate isomer and 35% of 2,6-tolylene diisocyanate isomer. One mole of the polyester was reacted with 3.00 moles of tolylene diisocyanate at 90° C. for 3 hours. Using the recipe given below a stable solid foam, insoluble in dimethylformamide, was obtained within 5 minutes of mixing the ingredients.

Foam recipe:                                     Parts by weight
  Diisocyanate modified polyester _____ 50
  Witco 77–86 (Emulsifier)[1] _____ 0.9
  Water _____ 1.8
  N,N',N'' - tris - (3 - dimethylamino - propyl)-
    sym-hexahydrotriazine _____ 0.2

[1] A commercial product consisting of the reaction product of an unsaturated fatty acid and ethylene oxide (70%), a sulfonated oil (15%), and an alkyl naphthenate (15%).

A foam recipte using a typical tertiary amine catalyst given below did not produce a stable foam. Structure collapse was observed and the reaction product was easily soluble in dimethylformamide 3 hours after the mixing of the ingredients.

Foam recipe:                                     Parts by weight
  Diisocyanate modified polyester _____ 50
  Witco 77–86 (Emulsifier)[1] _____ 0.9
  N-methyl morpholine _____ 0.8
  Water _____ 1.7

[1] A commercial product consisting of the reaction product of an unsaturated fatty acid and ethylene oxide (70%), a sulfonated oil (15%), and an alkyl naphthenate (15%).

Having thus described my invention, what I claim and desire to protect by Letters Patent is:

1. In a method for the trimerization of aromatic isocyanates through trimerization of the isocyanate groups, the improvement which consists in the step of carrying out the trimerization in the presence of at least about 0.1 mole per hundred moles of said isocyanate of a catalyst selected from the group consisting of (1) N,N',N''-tris-dialkylaminoalkyl-sym-hexahydrotriazines and (2) mixtures comprising a N,N',N''-trialkyl-sym-hexahydrotriazine and a tertiary aliphatic amine in which the aforesaid alkyl groups are lower alkyl radicals.

2. A method as set forth in claim 1, in which the trimerization of the isocyanate is carried out in an organic solvent solution of the isocyanate, the solvent being one in which the resulting trimer is substantially insoluble, and which is substantially unreactive with the isocyanate.

3. In a method for the trimerization of aromatic isocyanates through trimerization of the isocyanate groups, the improvement which consists in the step of carrying out the trimerization in the presence of at least about 0.1 mole per hundred moles of said isocyanate of a N,N',N''-tris-dialkylaminoalkyl-sym-hexahydrotriazine in which the aforesaid alkyl groups are lower alkyl radicals.

4. In a method for the trimerization of aromatic isocyanates through trimerization of the isocyanate groups, the improvement which consists in the step of carrying out the trimerization in the presence of at least about 0.1 mole per hundred moles of said isocyanate of a N,N',N''-trialkyl-sym-hexahydrotriazine and a tertiary aliphatic amine in which the aforesaid alkyl groups are lower alkyl radicals.

5. A method for making a triisocyanate which comprises trimerizing a urethano-aryl isocyanate through trimerization of the isocyanate groups in the presence of at least about 0.1 mole per hundred moles of said isocyanate of a catalyst selected from the group consisting of (1) N,N',N''-tris-dialkylaminoalkyl-sym-hexahydrotriazines and (2) mixtures comprising a N,N',N''-trialkyl-sym-hexahydrotriazine and a tertiary aliphatic amine in which the aforesaid alkyl groups are lower alkyl radicals to form a tris-(urethano-aryl) isocyanurate, and then heating the isocyanurate to decompose the urethano groups and convert them into isocyanate groups.

6. In a method for the trimerization of aromatic isocyanates through trimerization of the isocyanate groups, the improvement which consists in the step of carrying out the trimerization in the presence of at least about 0.1 mole per hundred moles of said isocyanate of N,N',N''-tris-(3-dimethylamino propyl)-sym-hexahydrotriazine.

7. A method for making a solid insoluble cross-linked high polymeric material from a liquid intermediate of relatively low molecular weight having at least two aromatic isocyanate groups per molecule said intermediate being the reaction product of a stoichiometric excess of an aromatic diisocyanate with a polyester terminated by alcholic hydroxyl groups, said polyester being a condensation polymer of a dihydric alcohol with an aliphatic dicarboxylic acid, which comprises adding to said liquid intermediate at least about 0.1 mole per hundred moles of isocyanate of a N,N',N''-tris-dialkylaminoalkyl-sym-hexahydrotriazine in which the aforesaid alkyl groups are lower alkyl radicals.

8. A method for making a solid insoluble cross-linked high polymeric material from a liquid intermediate of relatively low molecular weight having at least two aromatic isocyanate groups per molecule said intermediate being the reaction product of a stoichiometric excess of an aromatic diisocyanate with a polyester terminated by alcholic hydroxyl groups, said polyester being a condensation polymer of a dihydric alcohol with an aliphatic dicarboxylic acid, which comprises adding to said liquid intermediate at least about 0.1 mole per hundred moles of isocyanate of N,N',N''-tris-(3-dimethylamino propyl)-sym-hexahydrotriazine.

9. A method for making a solid insoluble cross-linked high polymeric material from a liquid intermediate comprised of the reaction product of a polyethylene-polypropylene adipate having predominantly hydroxyl end groups and a stoichiometric excess of 2,4-tolylene diisocyanate, said method comprising adding to said liquid intermediate at least about 0.1 mole per hundred moles of isocyanate of N,N',N''-tris-(3-dimethylamino propyl)-sym-hexahydrotriazine.

10. A method for making a solid insoluble cross-linked high polymeric material from a liquid intermediate comprised of the reaction product of a polyethylene-polypropylene adipate having a molecular weight of about 2000 and predominantly hydroxyl end-groups, made by esterifying adipic acid with a mixture of 80 mole proportions of ethylene glycol and 20 mole proportions of propylene glycol, and 2,4-tolylene diisocyanate, said method comprising adding to said liquid intermediate at least about 0.1 mole per hundred moles of isocyanate of N,N',N''-tris-(3-dimethylamino propyl)-sym-hexahydrotriazine.

11. A method for making a cross-linked insoluble product from a material containing at least two aromatic isocyanate groups per molecule said material being the reaction product of a stoichiometric excess of an aromatic diisocyanate with a polyester terminated by alcoholic hydroxyl groups, said polyester being a condensation polymer of a dihydric alcohol with an aliphatic dicarboxylic acid, which comprises adding to said material at least about 0.1 mole per 100 moles of said isocyanate of a catalyst selected from the group consisting of (1) N,N',N'' - tris - dialkylaminoalkyl - sym - hexahydrotriazine and (2) mixtures comprising a N,N',N''-trialkyl-sym-hexahydrotriazine and a tertiary aliphatic amine in which the aforesaid alkyl groups are lower alkyl radicals.

12. A method as set forth in claim 11, in which the reaction mixture comprises water, whereby said mixture is foamed while it is still fluid, and subsequently solidifies while still foamed to produce a solid foamed high polymeric material.

References Cited in the file of this patent
UNITED STATES PATENTS

| | | |
|---|---|---|
| 1,471,213 | Shepard et al. | Oct. 16, 1923 |
| 2,801,244 | Balon | July 30, 1957 |

OTHER REFERENCES

Saunders et al.: "Chem. Rev.," 1948, volume 43, pages 211 and 212.

Arnold et al.: "Chem. Revs.," volume 57, No. 1, February, 1957, pages 59 to 61.